US009101008B2

(12) United States Patent
Sumitani et al.

(10) Patent No.: US 9,101,008 B2
(45) Date of Patent: Aug. 4, 2015

(54) LIGHT EMITTER DRIVING DEVICE AND LIGHTING APPLIANCE THEREWITH

(71) Applicant: Rohm Co. Ltd., Kyoto (JP)

(72) Inventors: Takeshi Sumitani, Kyoto (JP); Akinobu Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/539,065

(22) Filed: Nov. 12, 2014

(65) Prior Publication Data

US 2015/0069929 A1   Mar. 12, 2015

Related U.S. Application Data

(63) Continuation of application No. 13/528,279, filed on Jun. 20, 2012, now Pat. No. 8,922,135.

(30) Foreign Application Priority Data

Jun. 23, 2011   (JP) ................... 2011-139207
May 23, 2012   (JP) ................... 2012-117438

(51) Int. Cl.
| H05B 37/02 | (2006.01) |
| H05B 39/04 | (2006.01) |
| H05B 41/36 | (2006.01) |
| G05F 1/00 | (2006.01) |
| H05B 33/08 | (2006.01) |

(52) U.S. Cl.
CPC ............ *H05B 33/08* (2013.01); *H05B 33/0815* (2013.01); *H05B 33/0824* (2013.01); *H05B 33/0851* (2013.01); *H05B 37/02* (2013.01); *Y02B 20/347* (2013.01); *Y02B 20/383* (2013.01)

(58) Field of Classification Search
None
See application file for complete search history.

(56) References Cited

U.S. PATENT DOCUMENTS

| 5,488,421 A * | 1/1996 | Hwang et al. ................. 348/448 |
| 7,872,429 B2 | 1/2011 | Steiner et al. |
| 8,093,826 B1 * | 1/2012 | Eagar et al. .................... 315/291 |
| 8,541,956 B2 * | 9/2013 | Lee et al. ....................... 315/291 |
| 8,581,518 B2 * | 11/2013 | Kuang et al. .................. 315/307 |
| 2010/0066266 A1 | 3/2010 | Huang et al. |
| 2011/0204778 A1 | 8/2011 | Sadwick et al. |

FOREIGN PATENT DOCUMENTS

JP   2010-73689   4/2010

* cited by examiner

*Primary Examiner* — Douglas W Owens
*Assistant Examiner* — Dedei K Hammond
(74) *Attorney, Agent, or Firm* — Fish & Richardson P.C.

(57) ABSTRACT

A light emitter driving device has a decoder portion which monitors a rectified voltage and generates a dimming signal, and a drive current control portion which controls a drive current to a light emitter according to the dimming signal. The decoder portion has a comparator which compares the rectified voltage with a predetermined threshold voltage to generate a comparison signal, a sampling counter which measures high-level and low-level periods of the comparison signal, a duty calculation portion which calculates the duty of the rectified voltage based on the output of the sampling counter, a filter calculation portion which excludes sporadic variation in duty by applying digital filtering to the output of the duty calculation portion, and a dimming signal generation portion which generates the dimming signal based on the output of the filter calculation portion.

11 Claims, 11 Drawing Sheets

LIGHT EMITTER DRIVING DEVICE AND LIGHTING APPLIANCE THEREWITH

CROSS-REFERENCE TO RELATED APPLICATIONS

This application is based on the following Japanese Patent Applications, and the contents of which are hereby incorporated by reference:

(1) Japanese Patent Application No. 2011-139207 (the filing date: Jun. 23, 2011)

(2) Japanese Patent Application No. 2012-117438 (the filing date: May 23, 2012)

BACKGROUND OF THE INVENTION

1. Field of the Invention

The present invention relates to a light emitter driving device that drives a light emitter such as an LED (light emitting diode) and the like, and to a lighting appliance that uses the light emitter driving device.

2. Description of Related Art

In recent years, various LED driver ICs compatible with a TRIAC (bidirectional thyristor) dimming method are put in practical applications. The TRIAC dimming method is a dimming method that has been conventionally employed as a dimming method for an incandescent lamp and the like. Accordingly, if an LED driver IC compatible with the TRIAC dimming method is used, it becomes possible to perform dimming of an LED lighting appliance by using an existing TRIAC dimmer.

Here, as an example of the conventional technology related to the above description, there is JP-A-2010-73689.

Figure 11A:
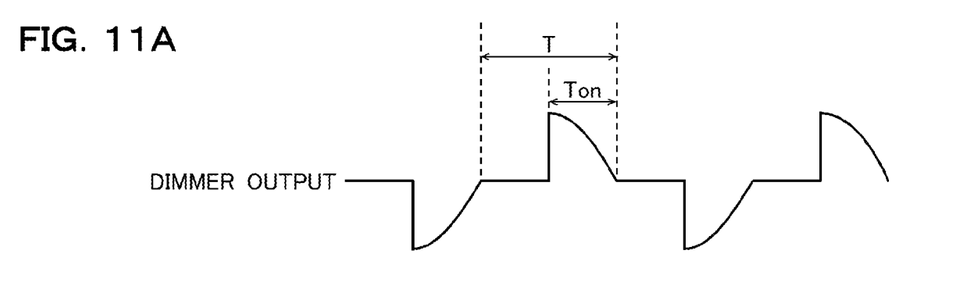
FIG. 11A is a view showing an output waveform (during a usual time) from a TRIAC dimmer.
Figure 11B:
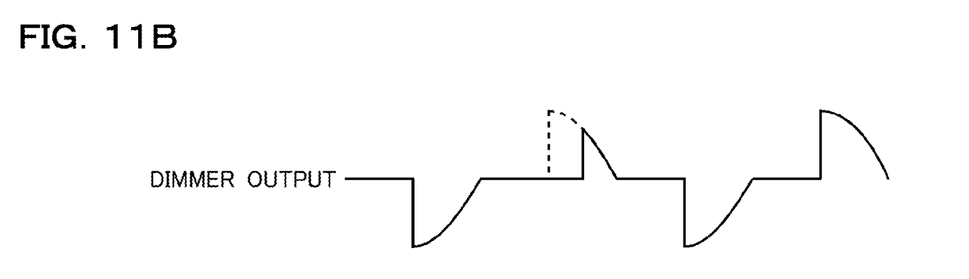
FIG. 11B is a view showing an output waveform (during a phase angle trouble time) from a TRIAC dimmer.
Figure 11C:
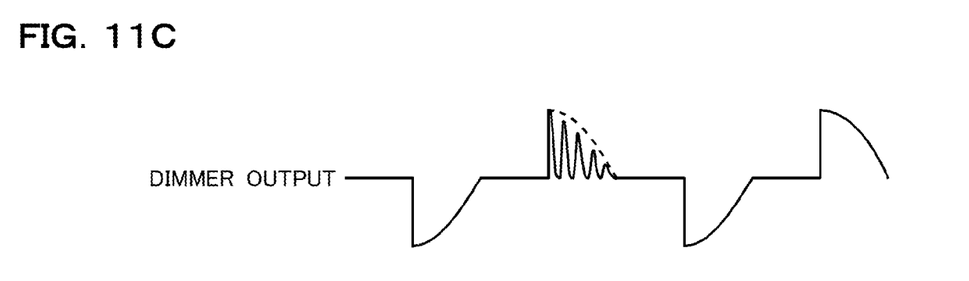
FIG. 11C is a view showing an output waveform (during a frequency trouble time) from a TRIAC dimmer.

Here, a TRIAC dimmer has a structure in which malfunction occurs if a hold current having a predetermined value or more is not flowing. FIG. 11A to FIG. 11C are each a view showing an output waveform from the TRIAC dimmer. Here, FIG. 11A shows an output waveform during a usual time, FIG. 11B shows an output waveform during a phase angle trouble time, and FIG. 11C shows an output waveform during a frequency trouble time.

For example, as shown in FIG. 11B, in a case where a phase angel trouble occurs in the output waveform from the TRIAC dimmer, brightness of an LED changes unintentionally, whereby a flicker occurs. Besides, for example, as shown in FIG. 11C, in a case where a frequency trouble occurs in the output waveform from the TRIAC dimmer, the LED repeats unintentional on/off, whereby a flicker occurs. FIG. 11B and FIG. 11C each exemplifies an overview in which the above trouble suddenly occurs during a period T; however, there is also a risk that the above trouble could occur constantly over a plurality of the periods T.

Here, in the conventional LED driver IC, as a measure against the malfunction of the TRIAC dimmer, a bleeder circuit for keeping the hold current of the TRIAC dimmer and an RC filter for applying a filter process to the output waveform from the TRIAC dimmer and the like are externally connected; however, it is hard to completely remove the flicker from the LED.

SUMMARY OF THE INVENTION

In light of the above problems found by the inventors of the present application, it is an object of the present invention to provide a light emitter driving device that is able to prevent a flicker of a light emitter due to malfunction of a TRIAC dimmer and a lighting appliance that uses the light emitter driving device.

To achieve the above object, a light emitter driving device according to the present invention is structured to include: a decoder portion that monitors a rectified voltage and generates a dimming signal; and a drive current control portion that controls a drive current for the light emitter in accordance with the dimming signal; wherein the decoder portion includes: a comparator that compares the rectified voltage with a predetermined threshold voltage to generate a comparison signal; a sampling counter that measures a high level time span and a low level time span of the comparison signal; a duty calculation portion that calculates a duty of the rectified voltage in accordance with an output from the sampling counter; a filter operation portion that applies a digital filter process to an output from the duty calculation portion to remove a sudden duty change; and a dimming signal generation portion that generates the dimming signal based on an output from the filter operation portion.

Other features, elements, steps, advantages and characteristics of the present invention will become more apparent from the following detailed description of preferred embodiments and the related attached drawings.

DETAILED DESCRIPTION OF PREFERRED EMBODIMENTS

LED Lighting Appliance

Figure 1:
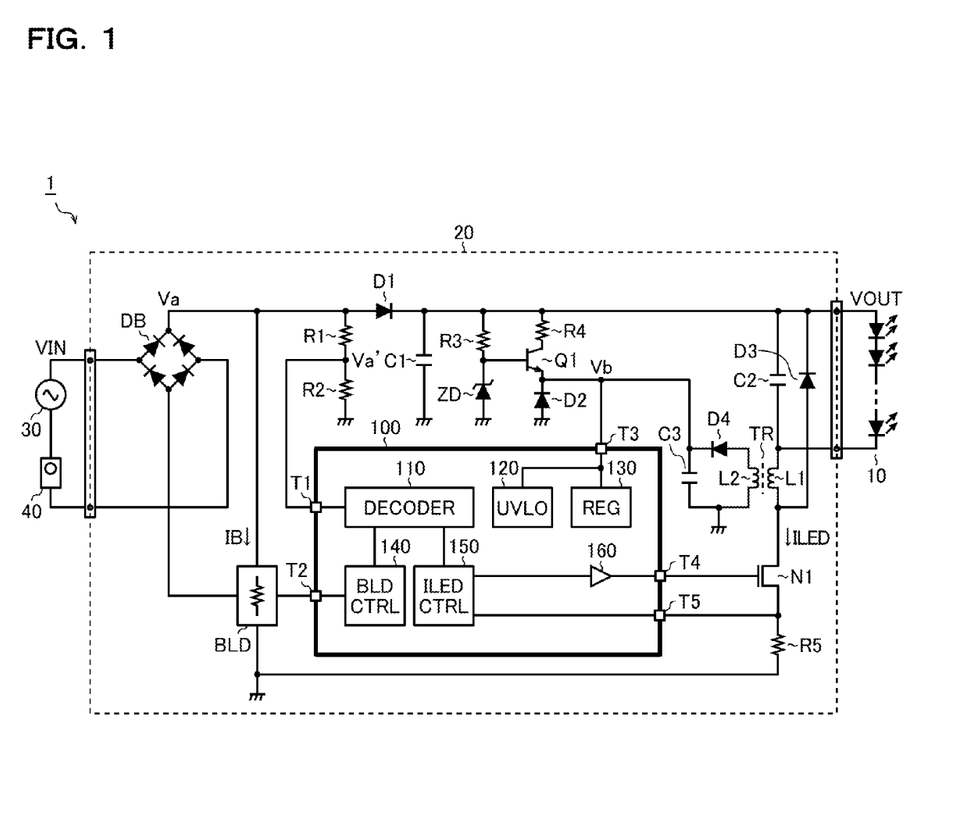
FIG. 1 is a diagram showing a structural example of an LED lighting appliance.

FIG. 1 is a diagram showing a structural example of an LED lighting appliance. An LED lighting appliance 1 in the present structural example has an LED module 10 and a power supply module 20.

The LED module 10 is a light source of the LED lighting appliance 1 that emits light which has a daylight color (a color temperature of about 5000 K) or a warm white color (a color temperature of about 3000 K), and includes a plurality of LED devices that are connected in series or in parallel.

The power supply module 20 converts an a.c. voltage VIN supplied from a commercial a.c. power supply 30 (e.g., 90 to 220 VAC) into a d.c. voltage VOUT (e.g., 50 VDC) and supplies it to the LED module 10. The power supply module 20 includes an LED driver IC 100 and various discrete components (a diode bridge DB, a bleeder circuit BLD, resistors R1 to R5, diodes D1 to D4, a Zener diode ZD, capacitors C1 to C3, an npn type bipolar transistor Q1, an N channel type MOS field effect transistor N1, and a transformer TR) externally connected to the LED driver IC which are mounted on a printed wiring board.

A first output terminal of the commercial a.c. power supply 30 is connected to a first input terminal of the diode bridge DB1. A second output terminal of the commercial power supply 30 is connected to a second input terminal of the diode bridge DB1 via a TRIAC dimmer 40 that performs phase control of the a.c. voltage VIN. A first output terminal of the diode bridge DB1 is connected to an anode of the diode D1 and is also connected to a ground terminal via the bleeder circuit BLD. A cathode of the diode D1 is connected to an anode of the LED module 10. A second output terminal of the diode bridge DB1 is connected to the ground terminal via the bleeder circuit BLD. A control terminal of the bleeder circuit BLD is connected to an external terminal T2 of the LED driver IC 100.

The resistors R1 and R2 are connected in series between the first output terminal of the diode bridge DB1 and the ground terminal. A connection node between (an application terminal of a rectified voltage Va) the resistors R1 and R2 is connected to an external terminal T1 of the LED driver IC 100. The capacitor C1 is connected between the cathode of the diode D1 and the ground terminal. A first terminal of the resistor R3 is connected to the cathode of the diode D1. A second terminal of the resistor R2 is connected to a cathode of the Zener diode ZD and a base of the transistor Q1. An anode of the Zener diode ZD is connected to the ground terminal. A collector of the transistor Q1 is connected to the cathode of the diode D1 via the resistor R4. An emitter of the transistor Q1 is connected to an external terminal T3 of the LED driver IC 100 and a cathode of the diode D2. An anode of the diode D2 is connected to the ground terminal.

A cathode of the diode D3 is connected to the cathode of the diode D1. An anode of the diode D3 is connected to a drain of the transistor N1. A source of the transistor N1 is connected to the ground terminal via the resistor R5 and also connected to an external terminal T5 of the LED driver circuit 100. A gate of the transistor N1 is connected to an external terminal T4 of the LED driver IC 100. A first terminal of the capacitor C2 is connected to the anode of the LED module 10. A second terminal of the capacitor C2 is connected to a cathode of the LED module 10.

A first terminal of a primary winding L1 that constitutes the transformer TR is connected to the cathode of the LED module 10. A second terminal of the primary winding L1 is connected to the drain of the transistor N1. A first terminal of a secondary winding L2 that constitutes the transformer TR is connected to an anode of the diode D4. A second terminal of the secondary winding L2 is connected to the ground terminal. A cathode of the diode D4 is connected to the external terminal T3 of the LED driver IC 100. The capacitor C3 is connected between the cathode of the diode D4 and the ground terminal <Power Supply Module>

Basic operation of the power supply module 20 having the above structure is described in detail.

The diode bridge DB is a rectification circuit that applies full-wave rectification to the a.c. voltage VIN to generate the rectified voltage Va. The diode D1 and the capacitor C1 are a smoothing circuit that smooths an output from the diode bridge DB to generate the voltage VOUT and supplies the d.c. voltage to the LED module 10. As described above, the diode bridge DB, the diode D1 and the capacitor C1 function as an AC/DC conversion portion that converts the a.c. voltage VIN into the d.c. voltage VOUT and supplies the d.c. voltage to the LED module 10. Here, a filter circuit for removing noise and surge may be disposed on a previous stage of the diode bridge DB.

The transistor N1 is a switch device that opens/closes an electric current route that extends from the cathode of the LED module 10 to the ground terminal. The LED driver IC 100 is a semiconductor integrated circuit device that performs on/off control of the transistor N1 such that a current (drive current ILED for the LED module 10) flowing to the ground terminal via the transistor N1 and the resistor R5 becomes equal to a target value. When the transistor N1 is in an on-state, the drive current ILED flows from the cathode of the diode D1 to the ground terminal via the LED module 10, the primary winding L1 of the transformer TR, the transistor N1, and the resistor R5. On the other hand, when the transistor N1 is in an off-state, the drive current ILED flows in a loop manner via the primary winding L1 of the transformer TR, the diode D3, and the LED module 10.

The transistor Q1, the resistors R3, R4, the diode D2, and the Zener diode ZD function as a simple regulator (emitter follower) that at a startup time of the LED driver IC 100, draws in a charge current for the capacitor C3 from the cathode of the diode D1 and generates a power supply voltage Vb for the LED driver IC 100. The transformer TR uses the drive current ILED flowing in the LED module 10 to supply power to the LED driver IC 100. Accordingly, after the startup of the LED driver IC 100, a charge operation for the capacitor C3 is performed in an electric current route that extends from the secondary winding L2 of the transformer TR via the diode D4, whereby the power supply to the LED driver IC 100 is continued. Here, a winding ratio of the transformer TR may be suitably set in light of the power supply voltage Vb that is necessary for operation the LED driver IC 100.

<LED Driver IC>

Next, an internal structure of the LED driver IC 100 is described. The LED driver IC 100 integrates: a decoder portion 110; a reduced voltage protection portion 120; a regulator portion 130; a bleeder control portion 140; a drive current control portion 150; and a driver portion 160. Here, the LED driver IC 100 is also able to integrate circuit blocks (a temperature protection portion, an overvoltage protection portion, an overcurrent protection portion, an LED short protection portion, an LED open protection portion, a power supply short/grounding protection portion and the like) other than the above circuit blocks.

The decoder portion 110 monitors the rectified voltage Va' (a divided voltage of the rectified voltage Va) that is applied from the connection node between the resistors R1 and R2 to the external terminal T1 and generates a dimming signal and a bleeder control signal. According to the LED driver IC 100 that includes the decoder portion 110, by using the TRIAC dimmer 40 that performs the phase control of the a.c. voltage VIN, it becomes possible to perform dimmer of the LED lighting appliance 1.

The reduce voltage protection portion 120 monitors whether the power supply voltage Vb applied to the external terminal T3 is lower than a predetermined threshold voltage or not and generates a reduced voltage protection signal.

The regulator portion 130 generates a predetermined internal power supply voltage from the power supply voltage Vb applied to the external terminal T3 and supplies it to each portion of the LED driver IC 100.

The bleeder control portion 140 performs drive control of the bleeder circuit BLD based on the bleeder control signal input from the decoder portion 110. According to this structure, when a hold current of the TRIAC dimmer 40 is deficient, by flowing a bleeder current IB via the bleeder circuit BLD, it is possible to keep a usual operation of the TRIAC dimmer 40.

The drive current control portion 150 controls the drive current ILED for the LED module 10 in accordance with the dimming signal input from the decoder portion 110. Specifically, the drive current control portion 150 generates an on/off control signal for the transistor N1 such that an application voltage (=ILED×R5) at the external terminal T5 becomes equal to a predetermined target value. Here, the above target value is set based on the dimming signal input from the decoder portion 110. According to this structure, by using the TRIAC dimmer 40, it becomes possible to perform the dimming of the LED lighting appliance 1.

The driver portion 160 amplifies an electric current capability of the on/off control signal input from the drive current control portion 150 to generate a gate signal for the transistor N1.

<Decoder Portion>

Figure 2:
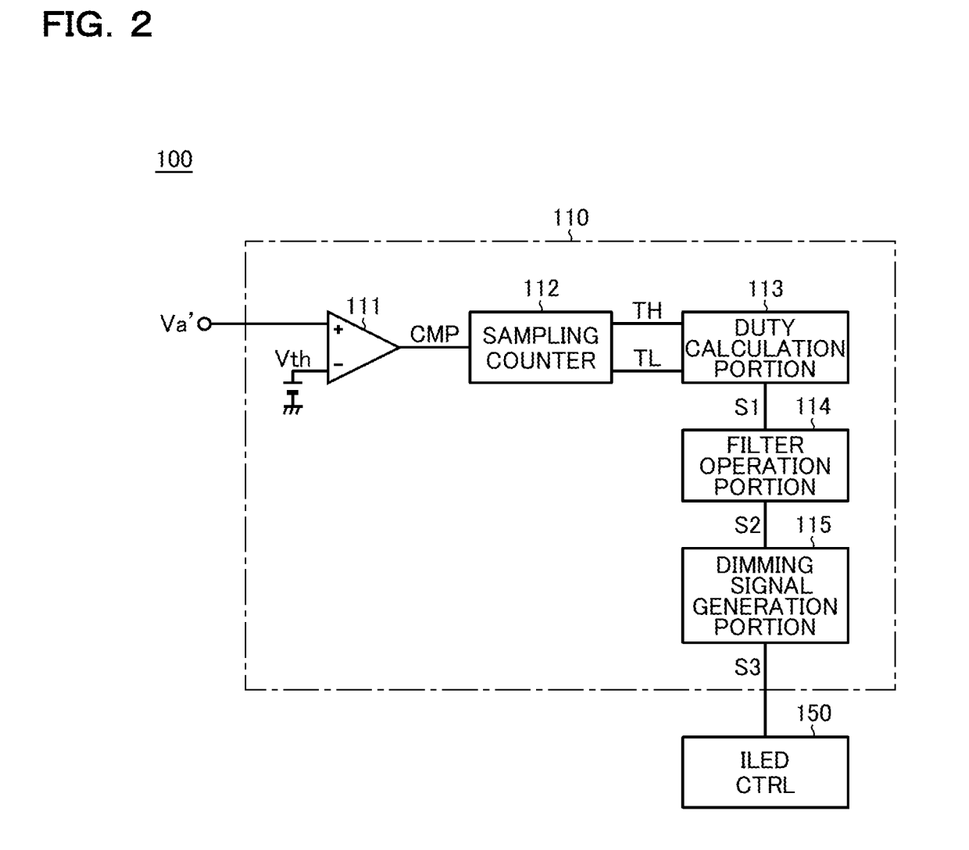
FIG. 2 is a diagram showing a first structural example of a decoder portion 110.

FIG. 2 is a diagram showing a first structural example of the decoder portion 110. The decoder portion 110 in the first structural example includes: a comparator 111; a sampling counter 112; a duty calculation portion 113; a filter operation portion 114; and a dimming signal generation portion 115.

The comparator 111 compares the rectified voltage Va' applied to a non-inverting input terminal (+) with a predetermined threshold value voltage Vth applied to an inverting input terminal (−), thereby generating a comparison signal CMP. The comparison signal CMP goes to a high level when the rectified voltage Va' is higher than the threshold value voltage Vth, while goes to a low level when the rectified voltage Va' is lower than the threshold value voltage Vth.

The sampling counter 112 measures a high level time span TH and a low level time span TL of the comparison signal CMP. The high level time span TH is obtainable by measuring a time span from a rising edge to a falling edge of the comparison signal CMP. The low level time span TL is obtainable by measuring a time span from a falling edge to a rising edge of the comparison signal CMP.

Figure 3:
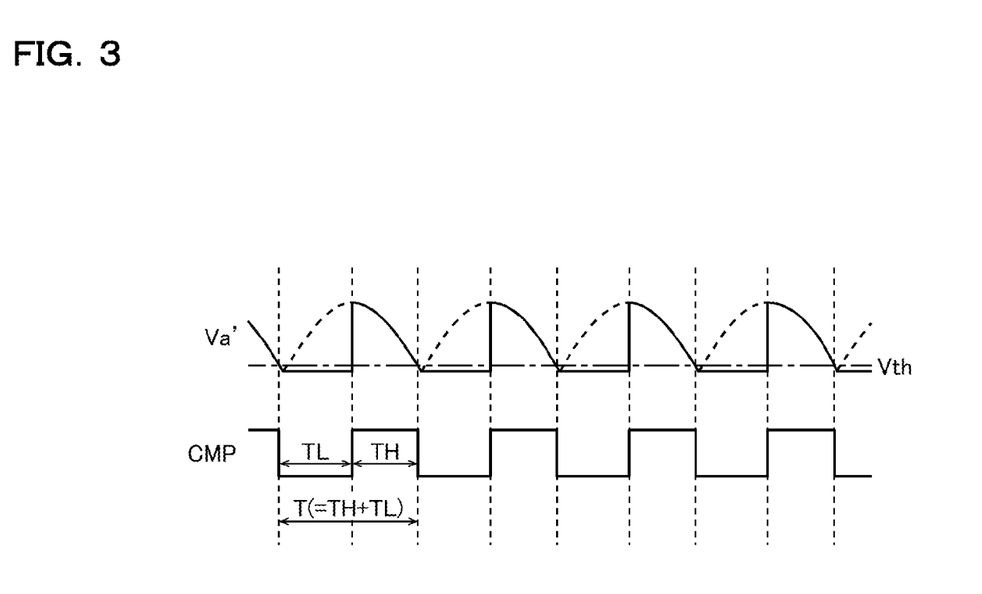
FIG. 3 is a view showing an operation example of a comparator 111 and a sampling counter 112.

FIG. 3 is a view showing an operation example of the comparator 111 and the sampling counter 112, and in order from top, represents voltage waveforms of the rectified voltage Va' and the comparison signal CMP.

The duty calculation portion 113 calculates an on-duty S1 (=TH/(TH+TL)) of the rectified voltage Va' at every period based on an output (TH, TL) from the sampling counter. The on-duty S1 of the rectified voltage Va' is equivalent to a phase angle, accordingly, it is also possible to understand the duty calculation portion 113 as a phase angle calculation portion.

The filter operation portion 114 applies a digital filter process to the on-duty S1 (digital value) output from the duty calculation portion 113, thereby removing a sudden duty change.

The dimming signal generation portion 115 generates a dimming signal S3 based on an on-duty signal S2 that already undergoes the digital filter process and is output from the filter operation portion 114.

Figure 4:
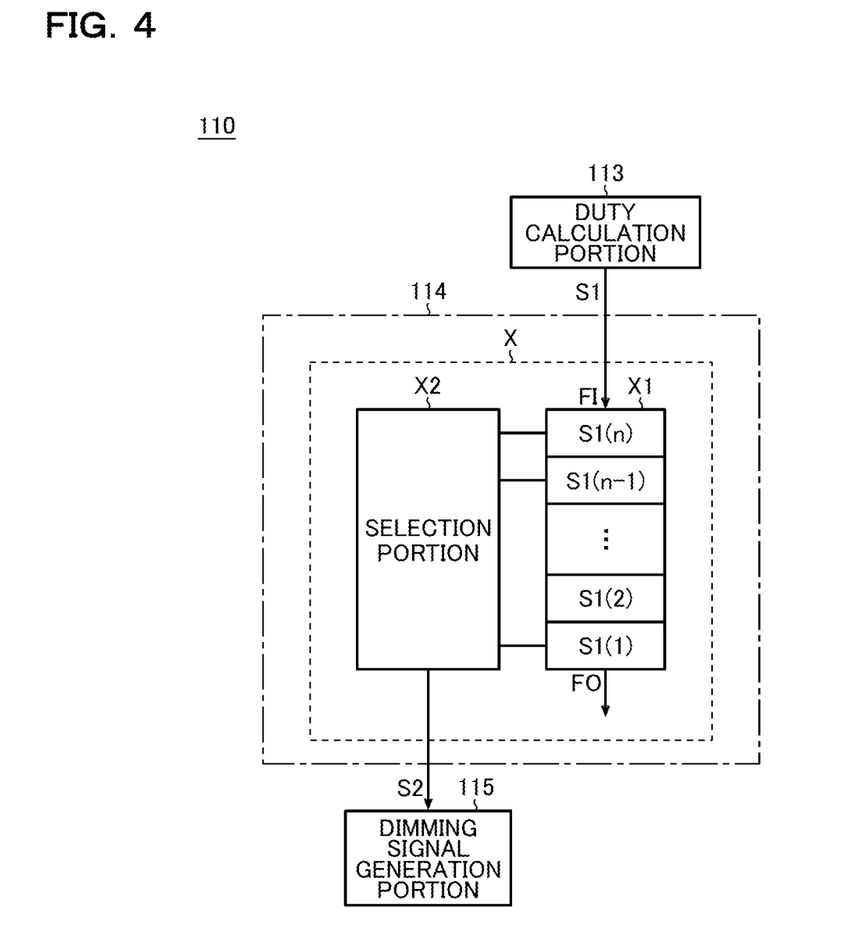
FIG. 4 is a diagram showing a first structural example of a filter operation portion 114.

FIG. 4 is a diagram showing a first structural example of the filter operation portion 114. The filter operation portion 114 in the first structural example includes a median filter X. The median filter X includes a FIFO portion X1 and a selection portion X2.

The FIFO portion X1 includes n-stage (e.g., 9-stage) registers and stores a group of duties S1 (1) to S1 (n) that are successively calculated over the nearest n periods.

The selection portion X2 selects a middle value from or a value (e.g., the third value from the top) larger than the middle value from the group of duties S1 (1) to S1 (n) stored in the FIFO portion X1 and output this as the on-duty S2 that already undergoes the filter process.

According to this structure, it is possible to remove a sudden duty change in the rectified voltage Va' and generate the dimming signal S3. Accordingly, as shown in FIG. 8B described above, even in a case where a phase angle trouble occurs in the waveform from the TRIAC dimmer 40, it becomes possible to prevent an unintentional brightness change of the LED module 10 and alleviate a flicker.

Here, in a case where the group of duties S1 (1) to S1 (n) over the nearest n periods are simply averaged, an unintentional decline occurs somewhat in the dimming signal S3 thanks to an unusual decline in the on-duty S1; however, according to above structure, it becomes possible to remove more suitably a sudden duty change and alleviate the unintentional change in the dimming signal S3.

Figure 5:
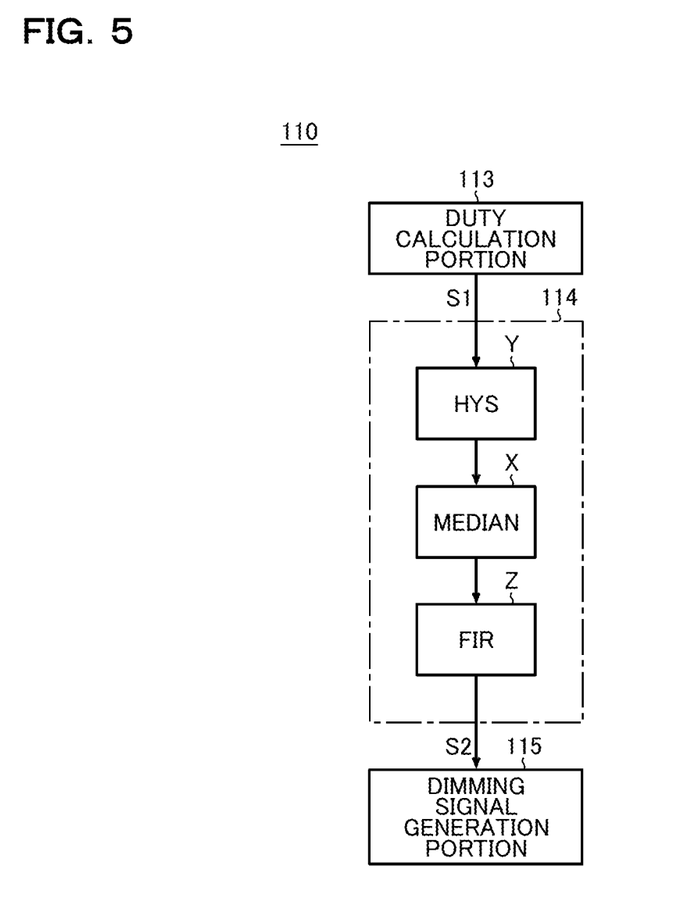
FIG. 5 is a diagram showing a second structural example of the filter operation portion 114.

FIG. 5 is a diagram showing a second structural example of the filter operation portion 114. The filter operation portion 114 in the second structural example includes a hysteresis filter Y and a FIR [Finite Impulse Response] filter Z besides the median filter X used as a constituent element in the first structural example.

The hysteresis filter Y is a kind of digital filter that has a characteristic when a difference between an input value and an output value falls in a predetermined range, does not change the output value. The hysteresis filter Y is disposed on a previous stage of the median filter X.

The FIR filter Z is a kind of digital filter that applies a weighted moving-average process to a plurality of input values. The FIR filter Z is disposed on a subsequent stage of the median filter X.

According to this structure, it becomes possible to further alleviate a flicker of the LED module 10.

Figure 6:
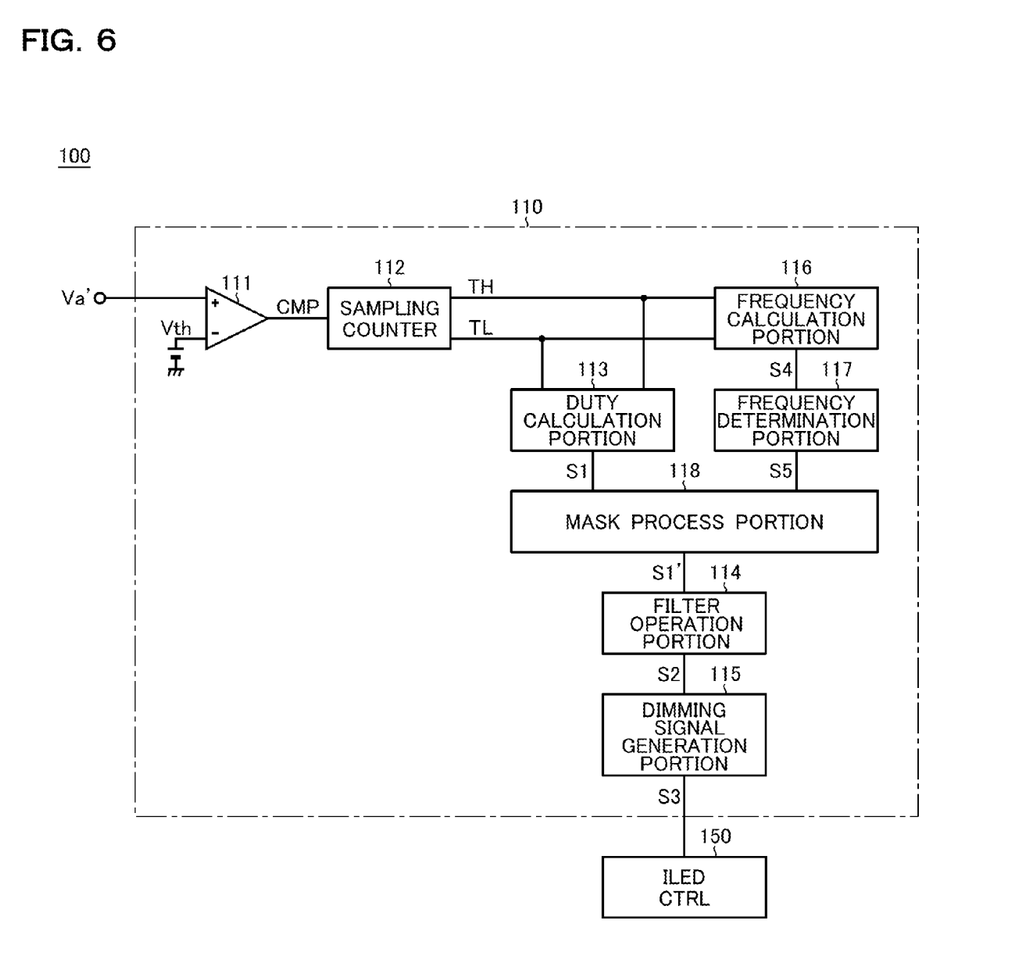
FIG. 6 is a diagram showing a second structural example of the decoder portion 110.

FIG. 6 is a diagram showing a second structural example of the decoder portion 110. The decoder portion 110 in the second structural example has substantially the same structure as the decoder 110 in the first structural example (FIG. 2), and is characterized in that a frequency calculation portion 116, a frequency determination portion 117, and a mask process portion 118 are added. Accordingly, the same constituent elements as in the first structural example are indicated by the same reference numbers as in FIG. 2 to skip double description, and hereinafter, description is performed focusing on characterizing portions of the second structural example.

The frequency calculation portion 116 calculates a frequency S4 (=1/(TH+TL)) of the rectified voltage Va' based on the output (TH, TL) from the sampling counter 112. The frequency S4 of the rectified voltage Va' is an inverse number of a period T (=TH+TL), accordingly, it is also possible to understand the frequency calculation portion 116 as a period calculation portion.

The frequency determination portion 117 determines whether the frequency S4 of the rectified voltage Va' falls in a predetermined range (e.g., 76.3 to 152.6 Hz (a range that includes a tolerable error of ±20% with respect to an oscillation frequency of 100 to 120 Hz of the commercial a.c. power supply 30)) or not and outputs a determination result signal S5. The determination result signal S5 goes to a high level when the frequency S4 of the rectified voltage Va' falls in the predetermined range, while goes to a low level when the frequency S4 of the rectified voltage Va' does not fall in the predetermined range.

The mask process portion 118 applies, based on the determination result signal S5, a mask process to the on-duty S1 output from the duty calculation portion 113. Specifically, the mask process portion 118 does not mask the on-duty signal S1 output from the duty calculation portion 113 to transmit it to the filter operation portion 114 when the determination result signal S5 is at the high level, while masks the on-duty signal S1 output from the duty calculation portion 113 to prohibit the transmission of it to the filter operation portion 114 when the determination result signal S5 is at the low level.

Here, in FIG. 6, for the sake of description, the mask process portion 118 is represented as if it is a logic gate that performs transmission/interruption of the on-duty S1; however, as long as it is possible to remove the on-duty S1 detected during a frequency trouble time of the rectified voltage Va' from the digital process target on the subsequent stage, any structure may be employed. For example, the mask process portion 118 may be structured so as to permit/prohibit data storage into the FIFO portion X1 (see FIG. 4) in accordance with the determination result signal S5.

According to this structure, as shown in FIG. 8C described above, even in a case where a frequency trouble occurs in the output waveform from the TRIAC dimmer 40, it becomes possible to prevent an unintentional on/off operation of the the LED module 10 and alleviate a flicker.

Figure 7:
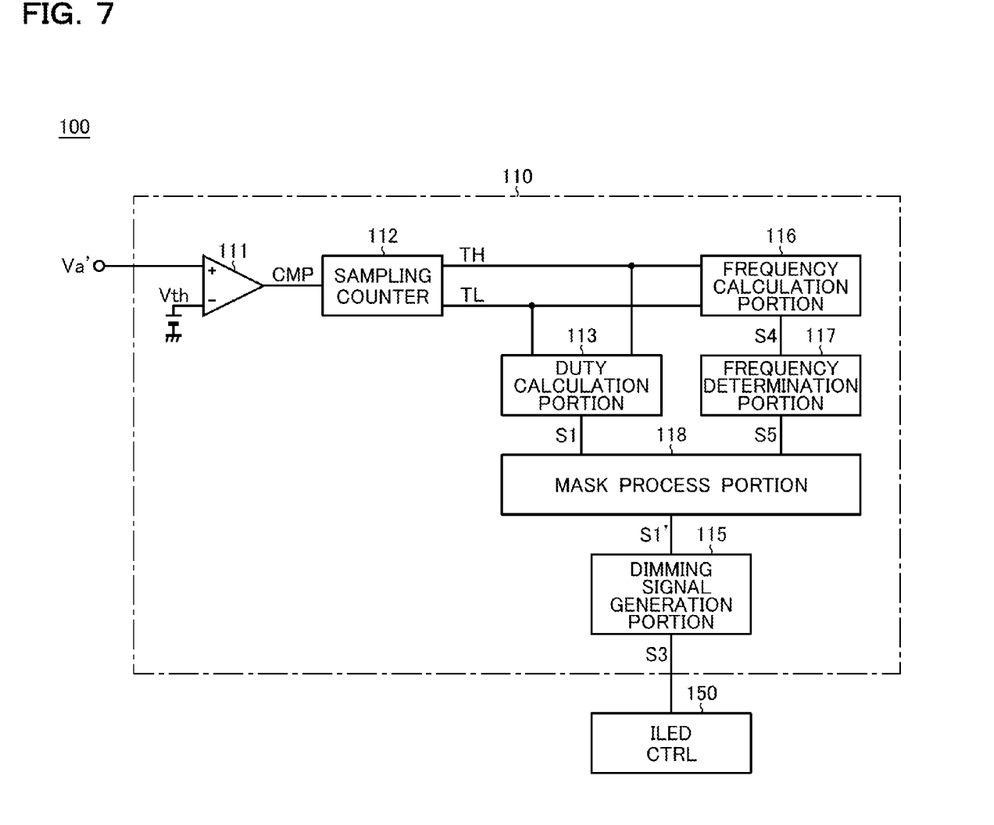
FIG. 7 is a diagram showing a third structural example of the decoder portion 110.

FIG. 7 is a diagram showing a third structural example of the decoder portion 110. The decoder portion 110 in the third structural example has substantially the same structure as the decoder 110 in the second structural example (FIG. 6), and is characterized in that the filter operation portion 114 is removed.

As described above, a first technological feature (the filter operation portion 114) for alleviating a flicker due to a phase angle trouble of the rectified voltage Va' and a second technological feature (the frequency calculation portion 116, the frequency determination portion 117, the mask process portion 118) for alleviating a flicker due to a frequency trouble of the rectified voltage Va' are usable independent of each other.

Here, it is sayable that the first structural example (FIG. 2) is a structure that uses the above first technological feature only; the second structural example (FIG. 6) is a structure that uses both of the above first and second technological features; and the third structural example (FIG. 7) is a structure that uses the second technological feature only.

Figure 8:
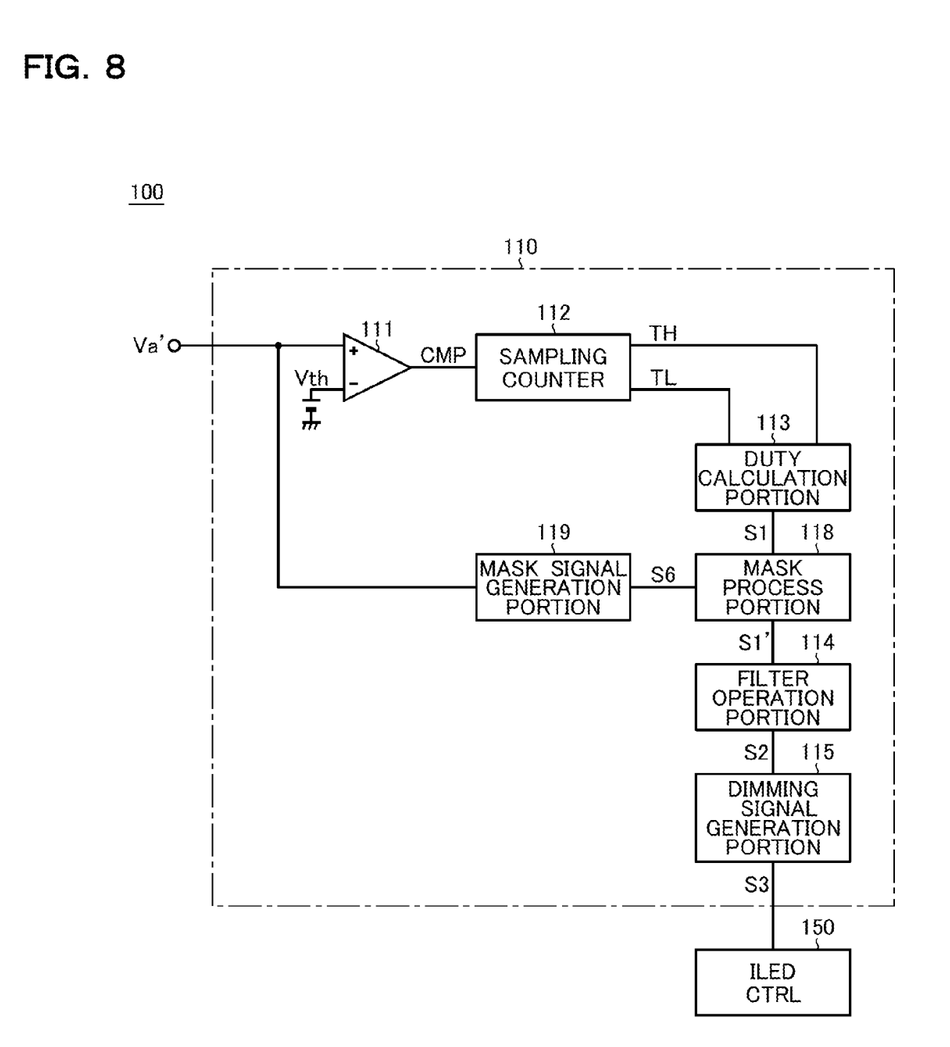
FIG. 8 is a diagram showing a fourth structural example of the decoder portion 110.

FIG. 8 is a diagram showing a fourth structural example of the decoder portion 110. The decoder portion 110 in the fourth structural example has substantially the same structure as the decoder 110 in the first structural example (FIG. 2), and is characterized in that the mask process portion 118 and the mask signal generation portion 119 are added. Accordingly, the same constituent elements as in the first structural example are indicated by the same reference numbers as in FIG. 2 to skip double description, and hereinafter, description is performed focusing on characterizing portions of the fourth structural example.

The mask process portion 118 applies, based on a mask signal S6, a mask process to the on-duty S1 output from the duty calculation portion 113. Specifically, the mask process portion 118 does not mask the on-duty signal S1 output from the duty calculation portion 113 to transmit it to the filter operation portion 114 when the mask signal S6 is at the high level, while masks the on-duty signal S1 output from the duty calculation portion 113 to prohibit the transmission of it to the filter operation portion 114 when the mask signal S6 is at the low level.

The mask signal generation portion 119 generates the mask signal S6 that changes in logic level at every rise of the rectified voltage Va'. Specifically, the mask signal S6 goes to the high level at every odd-numbered rise of the rectified voltage Va', while goes to the low level at every even-numbered rise of the rectified voltage Va'. A technological significance of the mask process that uses this mask signal S6 is described in detail with reference to FIG. 9.

Figure 9:
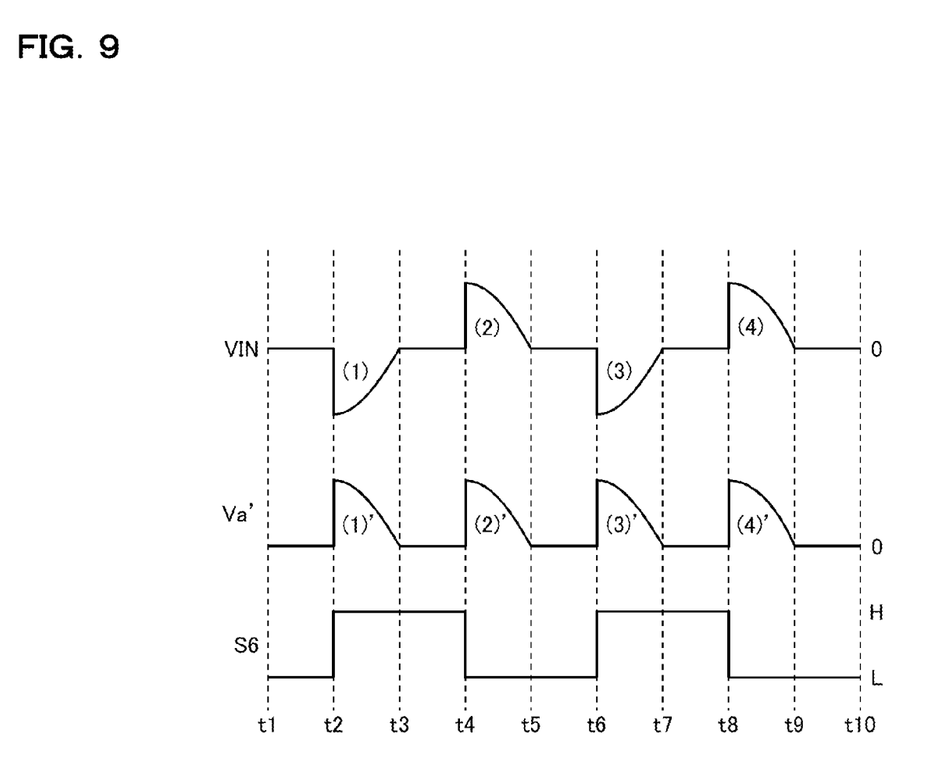
FIG. 9 is a timing chart for describing a mask process in the fourth structural example.

FIG. 9 is a timing chart for describing the mask process in the fourth structural example, and in order from top, represents the a.c. voltage VIN, the rectified voltage Va', and the mask signal S6. Here, in FIG. 9, times passes from times t1 to t10.

Output time spans (1) to (4) of the a.c. voltage VIN ideally become always a constant time span irrespective of positive and negative outputs as long as the TRIAC dimmer 40 is not operated. However, as a matter of fact, a slight error occurs between the negative output time spans (1) and (3) and positive output time spans (2) and (4), accordingly, the on-duty of the rectified voltage Va' periodically (alternately) changes, whereby there is a problem that a flicker of the LED module 10 occurs. Here, the error size is various depending on environment, and it is generally hard to correct it.

Because of this, a structure is employed, in which at odd-numbered rise times (1)' and (3)' (the high level time span of the mask signal S6) of the rectified voltage Va', the decoder portion 110 in the fourth structural example uses the mask process portion 118 and the mask signal generation portion 119 to transmit the on-duty S1 output from the duty calculation portion 113 to the filter operation portion 114 without masking it, while at even-numbered rise times (2)' and (4)' (the low level time span of the mask signal S6) of the rectified voltage Va', the decoder portion 110 in the fourth structural example masks the on-duty S1 output from the duty calculation portion 113 to prohibit the transmission of it to the filter operation portion 114.

In other words, the decoder portion 110 in the fourth structural example is structured so as to generate (update) the dimming signal S3 in accordance with the on-duty of the rectified voltage Va' during only the negative output time spans (1) and (3) of the a.c. voltage VIN.

According to this structure, brightness of the LED module 10 is decided in accordance with only the on-duty during the negative output time spans (1) and (3), accordingly, even in a case where an error occurs between the negative output time spans (1) and (3) and the positive output time spans (2) and (4) of the a.c. voltage VIN, a flicker of the LED module 10 comes not to occur.

Here, in the above description, the structure, in which the dimming signal S3 in accordance with the on-duty of the rectified voltage Va' is generated during only the negative output time spans (1) and (3) of the a.c. voltage VIN, is described as an example; however, the mask process in the fourth structural example is not limited to this, and in contrast to the above description, a structure may be employed, in which the dimming signal S3 in accordance with the on-duty of the rectified voltage Va' is generated during only the positive output time spans (2) and (4) of the a.c. voltage VIN.

<Specific Application Examples of LED Lighting Appliance>

Figure 10A:
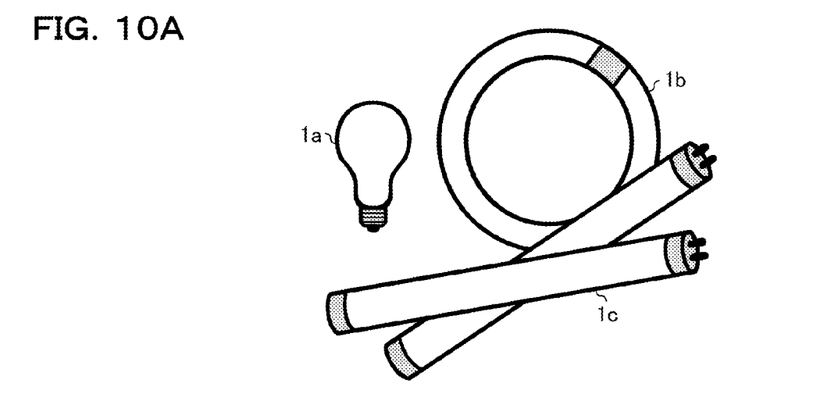
FIG. 10A is an appearance view showing a first application example (LED lamp) of an LED lighting appliance.
Figure 10B:
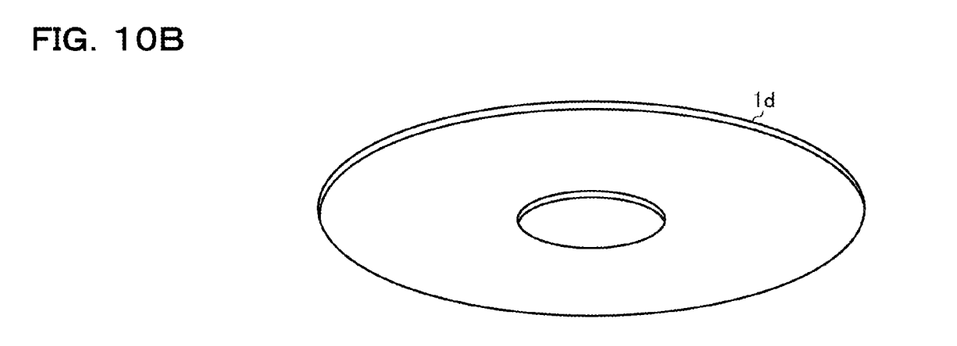
FIG. 10B is an appearance view showing a second application example (LED ceiling light) of an LED lighting appliance.
Figure 10C:
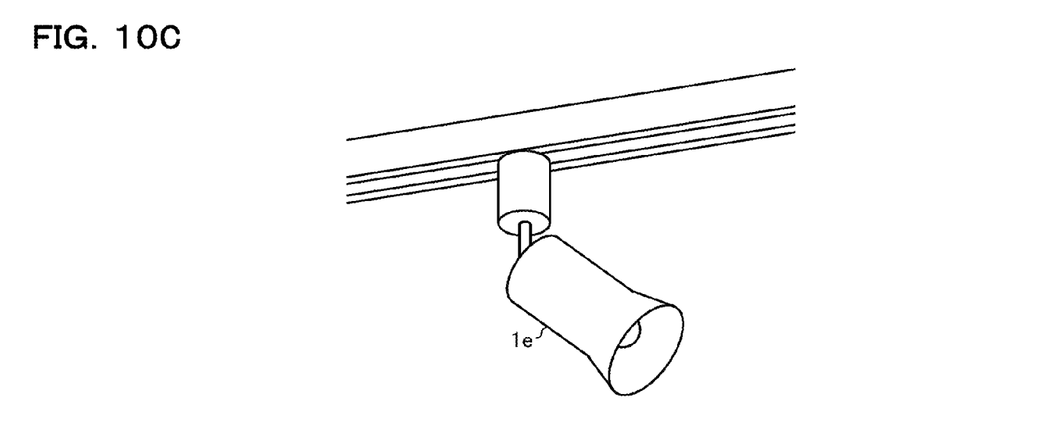
FIG. 10C is an appearance view showing a third application example (LED downlight) of an LED lighting appliance.

FIG. 10A to FIG. 10C are appearance views respectively showing first to third application examples of the LED lighting appliance 1. FIG. 10A shows a bulb-shaped LED lamp 1a, an annular-shaped LED lamp 1b, and a linear tube-shaped LED lamp 1c. Besides, FIG. 10B shows an LED ceiling light 1d, and FIG. 10C shows an LED downlight 1e. These illustrations are all examples, and the LED lighting appliance 1 may be usable in various kinds of forms.

INDUSTRIAL APPLICABILITY

The present invention is preferably applicable, for example, as a technology that increases the reliability of an LED driver IC compatible with the TRIAC dimming method.

Other Modifications

In the above embodiments, the structures, in which the present invention is applied to the LED driver IC, are described as examples; however, the application target of the present invention is not limited to these, but widely applicable to general light emitter driving devices that drive other light emitters (e.g., organic EL [electro-luminescence] devices).

It is possible to add various modifications to the various technological features disclosed in the present specification in the scope that does not depart the spirit of the technological creation besides the above embodiments. For example, mutual replacement of the bipolar transistor and the MOS field effect transistor, and logic level inversion of the various signals are arbitrary. In other words, it should be conceived that the above embodiments are examples in all respects and are not limiting, and it should be understood that the technological scope of the present invention is not indicated by the above description of the embodiments but by the claims, and all modifications within the scope of the claims and the meaning equivalent to the claims are covered.

LIST OF REFERENCE NUMERALS

1 LED lighting appliance
1a bulb-shaped LED lamp
1b annular-shaped LED lamp
1c linear tube-shaped LED lamp
1d ceiling light
1e downlight
10 LED module
20 power supply module
30 commercial a.c. power supply
40 TRIAC dimmer
100 LED driver IC
110 decoder portion
111 comparator
112 sampling counter
113 duty calculation portion
114 filter operation portion
115 dimming signal generation portion
116 frequency calculation portion
117 frequency determination portion
118 mask process portion
119 mask signal generation portion
120 reduced voltage protection portion (UVLO portion)
130 regulator portion
140 bleeder control portion
150 drive current control portion
160 driver portion DB diode bridge
BLD bleeder circuit
R1 to R5 resistors
D1 to D4 diodes
ZD Zener diode
C1 to C3 capacitors
Q1 npn type bipolar transistor
N1 N channel type MOS field effect transistor
TR transformer
L1 primary winding
L2 secondary winding
X median filter
X1 FIFO portion
X2 selection portion
Y hysteresis filter
Z FIR filter

What is claimed is:

1. A light emitter driving device comprising:
a decoder portion that monitors a rectified voltage and generates a dimming signal and a bleeder control signal;
a bleeder control portion that performs drive control of a bleeder circuit based on the bleeder control signal input from the decoder portion, the bleeder circuit generating a bleeder current; and
a drive current control portion that controls a drive current for the light emitter in accordance with the dimming signal; wherein
the decoder portion includes:
a hysteresis filter that has a characteristic when a difference between an input value and an output value falls in a predetermined range, does not change the output value.

2. The light emitter driving device according to claim 1, wherein
the decoder portion further includes:
a comparator that compares the rectified voltage with a predetermined threshold voltage to generate a comparison signal;
a sampling counter that measures a high level time span and a low level time span of the comparison signal;
a duty calculation portion that calculates a duty of the rectified voltage in accordance with an output from the sampling counter, an output of the duty calculation portion input into the hysteresis filter; and
a dimming signal generation portion that generates the dimming signal based on an output from the hysteresis filter.

3. The light emitter driving device according to claim 2, wherein
the decoder portion further includes:
a frequency calculation portion that calculates a frequency of the rectified voltage in accordance with the output from the sampling counter;
a frequency determination portion that determines whether the frequency of the rectified voltage falls in a predetermined range or not; and
a mask process portion that applies a mask process to the output from the duty calculation portion in accordance with a determination result from the frequency determination portion.

4. The light emitter driving device according to claim 2, wherein
the decoder portion further includes:
a mask signal generation portion that generates a mask signal which changes in logic level at every rise of the rectified voltage; and a mask process portion that applies a mask process to the output from the duty calculation portion in accordance with the mask signal.

5. A lighting appliance comprising:
a light emitter;
a rectification circuit that rectifies an a.c. voltage to generate a rectified voltage;
a smoothing circuit that generates a d.c. voltage from the rectified voltage and supplies the dc voltage to the light emitter;
a bleeder circuit that keeps a hold current of a TRIAC dimmer which performs a phase control of the a.c. voltage;
a switch device that opens/closes an electric current route in which a driving current for the light emitter flows; and
a light emitter driving device that performs on/off control of the switch device; wherein
the light emitter driving device includes:
  a decoder portion that monitors a rectified voltage and generates a dimming signal and a bleeder control signal;
  a bleeder control portion that performs drive control of the bleeder circuit based on the bleeder control signal input from the decoder portion; and
  a drive current control portion that controls a drive current for the light emitter in accordance with the dimming signal; wherein
the decoder portion includes:
  a hysteresis filter that has a characteristic when a difference between an input value and an output value falls in a predetermined range, does not change the output value.

6. The lighting appliance according to claim 5, wherein the decoder portion further includes:
  a comparator that compares the rectified voltage with a predetermined threshold voltage to generate a comparison signal;
  a sampling counter that measures a high level time span and a low level time span of the comparison signal;
  a duty calculation portion that calculates a duty of the rectified voltage in accordance with an output from the sampling counter, an output of the duty calculation portion input into the hysteresis filter; and
  a dimming signal generation portion that generates the dimming signal based on an output from the hysteresis filter.

7. The lighting appliance according to claim 6, wherein the decoder portion further includes:
  a frequency calculation portion that calculates a frequency of the rectified voltage in accordance with the output from the sampling counter;
  a frequency determination portion that determines whether the frequency of the rectified voltage falls in a predetermined range or not; and
  a mask process portion that applies a mask process to the output from the duty calculation portion in accordance with a determination result from the frequency determination portion.

8. The lighting appliance according to claim 6, wherein the decoder portion further includes:
  a mask signal generation portion that generates a mask signal which changes in logic level at every rise of the rectified voltage; and
  a mask process portion that applies a mask process to the output from the duty calculation portion in accordance with the mask signal.

9. The lighting appliance according to claim 5, wherein the drive current control portion performs the on/off control of the switch device such that a current flowing in the switch device becomes equal to a target value which is set based on the dimming signal.

10. The lighting appliance according to claim 5, wherein the light emitter includes an LED device.

11. The lighting appliance according to claim 10, wherein the lighting appliance is a bulb-shaped LED lamp, an annular-shaped LED lamp, a linear tube-shaped LED lamp, a ceiling light, or a downlight.

* * * * *